(12) United States Patent
Bidare

(10) Patent No.: US 8,775,814 B2
(45) Date of Patent: Jul. 8, 2014

(54) PERSONALIZED BIOMETRIC IDENTIFICATION AND NON-REPUDIATION SYSTEM

(75) Inventor: Prasanna Bidare, Bangalore (IN)

(73) Assignee: Tata Consultancy Services Ltd. (IN)

(*) Notice: Subject to any disclaimer, the term of this patent is extended or adjusted under 35 U.S.C. 154(b) by 99 days.

(21) Appl. No.: 13/596,340

(22) Filed: Aug. 28, 2012

(65) Prior Publication Data

US 2013/0263238 A1    Oct. 3, 2013

(30) Foreign Application Priority Data

Apr. 2, 2012 (IN) .......................... 1072/MUM/2012

(51) Int. Cl.
| H04L 9/32 | (2006.01) |
| H04L 29/06 | (2006.01) |
| G06F 21/32 | (2013.01) |
| G07C 9/00 | (2006.01) |
| G06Q 20/00 | (2012.01) |
| G06K 9/00 | (2006.01) |

(52) U.S. Cl.
CPC ........ *H04L 63/0861* (2013.01); *G06K 9/00885* (2013.01); *G06F 21/32* (2013.01); *G07C 9/00087* (2013.01); *G07C 9/00103* (2013.01); *G07C 2009/00095* (2013.01); *G06C 2209/12* (2013.01); *G06Q 20/00* (2013.01); *H04L 9/3231* (2013.01); *H04L 9/3271* (2013.01); *H04L 2209/56* (2013.01)
USPC ........... 713/176; 713/155; 713/156; 713/157; 713/175; 713/177; 713/180; 705/67; 380/200; 380/201

(58) Field of Classification Search
CPC ... G06F 21/32; H04L 9/3231; G06K 9/00885
USPC ............ 713/155–157, 175–177, 180; 705/67; 380/200–201
See application file for complete search history.

(56) References Cited

U.S. PATENT DOCUMENTS

| 7,676,439 B2 * | 3/2010 | Tattan et al. .................... 705/67 |
| 8,443,201 B2 * | 5/2013 | Takahashi et al. ............ 713/186 |
| 2003/0105966 A1 * | 6/2003 | Pu et al. ........................ 713/186 |
| 2006/0143441 A1 | 6/2006 | Giobbi |
| 2010/0042848 A1 | 2/2010 | Rosener |
| 2011/0204142 A1 | 8/2011 | Rao |

FOREIGN PATENT DOCUMENTS

| WO | WO 2006055575 A2 * | 5/2006 |
| WO | WO 2013098851 A2 * | 7/2013 |

* cited by examiner

*Primary Examiner* — Thanhnga B Truong
(74) *Attorney, Agent, or Firm* — Robert Plotkin, P.C.

(57) ABSTRACT

A system and a method for providing a personalized biometric identification system to facilitate in securing critical transactions have been disclosed. The system includes a server which captures pre-designated biometric prints of a user, personalizes them and registers them on a bio print reader, owned by the user, over a unidirectional non-Internet based channel. The system overcomes the challenges involved in employing biometrics as a part of non-repudiation process for authorizing Internet based critical transactions for multiple entities by assuring the safety of the biometric prints of the users and eliminating additional hardware requirements.

10 Claims, 2 Drawing Sheets

PERSONALIZED BIOMETRIC IDENTIFICATION AND NON-REPUDIATION SYSTEM

CROSS REFERENCE TO RELATED APPLICATIONS

Figure 1:
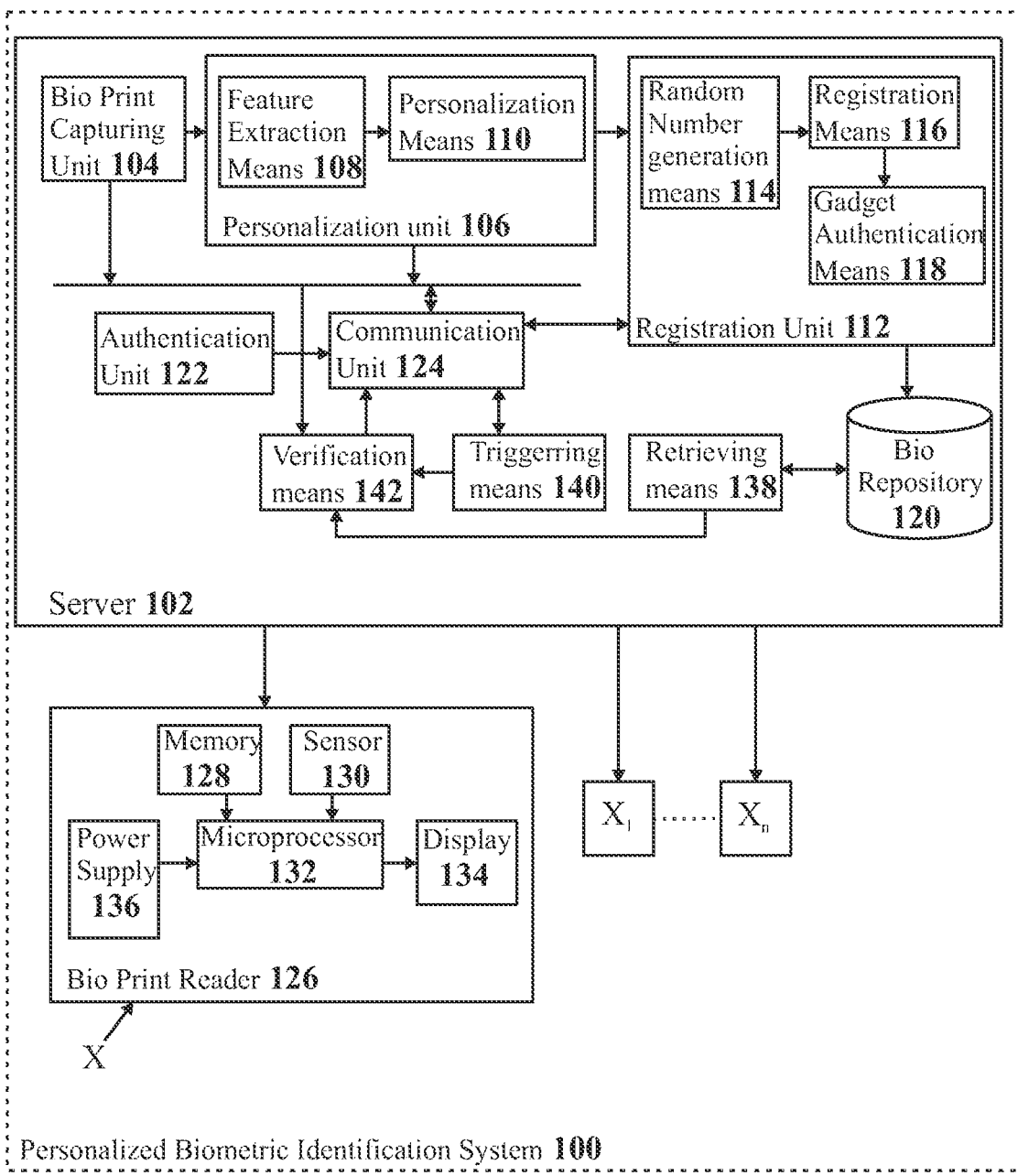

This application claims priority from Indian Patent Application Serial Number 1072/MUM/2012, filed on Apr. 2, 2013, entitled, "A Personalized Biometric Identification And Non-Repudiation System," which is hereby incorporated by reference herein.

FIELD OF THE DISCLOSURE

The present disclosure relates to the field of Biometrics Identity and Non Repudiation Management.

DEFINITIONS OF TERMS USED IN THE DISCLOSURE

The term 'authentication token' in this specification relates to a challenge-response based multi factor authentication process wherein a user is challenged with a session specific One Time Password (OTP), One Time Equation (OTE) or biometric verification for authorizing a critical transaction.

The term 'bio print reader' in this specification relates to an electronic device owned by individuals that can be in the form of a swipe card, a smart card, smart phone or the like gadgets to facilitate the non-repudiation process.

The term 'biometric print' in this specification relates to any one or a combination of a fingerprint, a palm print, at least one iris image, or vocal characteristics utilized for authenticating a user.

The term 'critical transaction' in this specification relates to any online or offline action or event which requires the identity and credentials of a user to be verified before allowing access to sensitive information or entry to a restricted zone.

The term 'non-Internet based channel' in this specification relates to a hardwired or private data transfer path used for communication between two devices. The term 'terminal' in this specification relates to a mobile phone, a desktop, a laptop, a tablet PC, a Point of Sales equipment or the like devices which include at least one input device like a keyboard, keypad, touch screen input, camera, bar code reader and voice inputs and at least one output device like a display and connectivity to the Internet to communicate with a remote server.

BACKGROUND

Security is one of the key areas of concern in today's time both at national and local levels. While breach of security systems at various ports of entry can lead to illegitimate people entering a country causing national threat. At a local level, a compromise on the Internet security can lead to huge financial losses for individuals or to their corporate.

Biometric authentication systems have been around for a while now and slowly these systems are being implemented for gearing up security both at the national and local levels.

At the local level, biometric based authentication devices have been in use. However, the scope of these devices is restricted to access control applications. In access control applications, biometric prints have been used to give users access to their homes, offices or personal property like electronic devices, cars, electronic safes and the like. However, these systems do not harness the true capability of biometric systems.

Lately cyber-crimes are increasing by the hour with fraudulent individuals hacking into financial accounts, e-commerce sites and databases holding sensitive information. Hence, there is felt a need for not only a security mechanism which can safeguard the sensitive information and provide access to only genuine users, but also non-repudiate in terms law of a land's forensic requirements. Biometric based authentication for conducting e-commerce/e-banking transactions is one such mechanism. However, this form of authentication has not been widely accepted due to implementation challenges faced by retail markets for capturing and storing bio prints of users in advance and the need for specialized hardware in the form of biometric scanners to scan and transmit the bio prints to authenticate users.

Many governmental agencies across the globe have now installed biometric reading gadgets at various ports of entry to obtain biometric prints of incumbent travelers, which offer 'Go' or 'No Go' to gate the entry. In addition to obtaining biometric prints, the government agencies are also issuing biometric visas which include a copy of the travelers' digital photo and selected biometric print. The biometric print in the visa is compared with the real-time scan of the individual's biometric prints, at the port of entry, to confirm the identity of the traveler.

In one of such endeavors, Government of India is working under Unique Identification (UID) program to develop country vide bio print repository as a tool to identify the citizens of India and use the identification information for possible use in e-Commerce.

To combat both the national and local level security issues biometric presents a strong authentication solution. Biometric mechanisms enable agencies at the national and local level to capture a combination of biometric prints of users including fingerprints, iris scan, voice scan and the like which can be stored at a central location. The users can be authenticated using the biometric scan stored at the central repository for granting access.

However, users all over the world are skeptical about passing their biometric prints on any communication media during or even after the authentication process. As in the event that the biometric prints are compromised a user will completely loose his/her bio identity and future access to any of the biometric based systems because biometric based systems have no password reset mechanism unlike in number or picture based challenge response process.

At the same length, the BFI's (Banking, Finance and Insurance) are the most affected parties in business due to cash loss as a result of false or imposter authentication. Hence, the BFI's demand a more clear and unambiguous non-repudiation process in place while offering ease of operation to their clients by bringing in the much required confidence to use the net based transaction.

Further, currently at the national level in India, the UID or any equivalent agency doesn't undertake the task of capturing the biometric prints of travelling or visiting foreigners to determine their authenticity during their temporary relocation. Therefore, there is felt a need for a system which:

harnesses the true capability of embedding the unambiguous non-repudiation process which remains agnostic to multiple OEM (Original Equipment Manufacturer) bio reading gadgets;
  overcomes the challenges faced in providing biometric based authentication and authorization mechanisms for critical transactions;

prevents undue tampering of biometric prints of users; and ensures that a user's biometric prints are not transmitted over the Internet.

OBJECTS

It is an object of the present disclosure to provide a system which harnesses the true capability of biometric authentication and non-repudiation process, and which can also be utilized for forensic applications.

It is another object of the present disclosure to provide a system which ensures that a user's biometric prints are not transmitted over the Internet.

It is still another object of the present disclosure to provide a system which overcomes the challenges faced in providing biometric based authentication and authorization mechanisms.

It is yet another object of the present disclosure to provide a system which prevents tampering of biometric prints of users while conducting critical transactions.

SUMMARY

The present disclosure envisages a personalized biometric identification and non-repudiation system to facilitate in securing critical transactions for users, the system comprising:
  a server adapted to personalize designated biometric prints of a user to compute and register at least one set of personalized biometric signatures with a unique Device identification Number, wherein the set of personalized biometric signatures are represented by a Bio-print identification Number and a User identification Number, the server further adapted to execute a non-repudiation process to identify and authenticate a user and generate a non-repudiation certificate for authorizing a critical transaction; and
  a plurality of bio print readers discretely associated with the users and embedded with the set of personalized biometric signatures for a user by the server over a unidirectional non-Internet based channel, the bio print reader adapted to facilitate the non-repudiation process by verifying the identity of a user on matching a sensed biometric print of a user with the biometric signature.

Typically, the unique Device identification Number is embossed on the bio print reader, the unique device identification number is selected from the group consisting of a 2D bar code, a twelve digit code and a Quick Response (QR) code.

Preferably, the unidirectional non-Internet based communication channel is selected from the group consisting of a flicker window, an application programmable optical interface and a smart card reader/writer interface hardwired to the server.

Further, the server comprises:
  a bio print capturing unit adapted to interface with a biometric scanner and capture at least one biometric print for a user over a non-Internet based channel in conformance with pre-selected governmental agency standards and further adapted to apply transformation function on the captured biometric print to make it compatible for data transfer on a corresponding user's bio print reader;
  a personalization unit having:
    feature extraction means adapted to digitize and extract salient features from the compatible biometric print and represent them as the Bio-print identification Number; and
    personalization means adapted to hash the salient features using a random number to generate at least one biometric hash represented as the User identification Number;
  a registration unit co-operating with the personalization unit having:
    random number generation means adapted to generate the unique Device identification Number for a bio print reader;
    registration means adapted to register and transfer the Bio-print identification Number, the User identification Number, and the Device identification Number to a bio print reader corresponding to a user; and
    gadget authentication means adapted to initiate a first self-authentication request to a bio print reader to activate the bio print reader registration;
  a bio repository adapted to store user details, the User identification Number and corresponding bio print reader's Device identification Number;
  an authentication unit adapted to generate at least one encrypted authentication token on receiving an incoming authentication request and further adapted to verify response for the token to authenticate identity of a user, generate a non-repudiation certificate and authorize a critical transaction, wherein the authentication unit encrypts the authentication token using the User identification Number stored in the bio repository in full or partial or using any challenge number which is compatible for non-symmetric cryptography; and
  a communication unit co-operating with the bio print capturing unit, the registration unit and the authentication unit and adapted to provide multiple communication channels including Internet and non-Internet based channels to transfer and receive information.

In addition, the server for forensically repudiating a user further comprises:
  retrieving means adapted to retrieve the user's unique Device identification Number and corresponding User identification Number from the bio repository;
  triggering means adapted to instruct the bio print capturing unit and the personalization unit to trigger the process of recapturing the user's biometric prints and computing a new User identification Number; and
  verification means co-operating with the personalization unit, the retrieving means and the triggering means, the verification means adapted to compare the new User identification Number with the retrieved old User identification Number to confirm the identity of the user in the event that the old and new identification numbers match.

Still further, the bio print reader comprises:
  a read-only memory adapted to store at least the Bio-print identification Number and the User identification Number;
  at least one sensor selected from the group consisting of a biometric sensor and an optical sensor, the sensor adapted to sense at least one encrypted authentication token and at least one designated biometric print of a user;
  a microprocessor embedded with custom applications including security protocols, biometric hash and key management application and co-operating with the memory and the sensor, the microprocessor adapted to process the sensed biometric print of the user and further adapted to decrypt the encrypted authentication token using the User identification Number in the event that the processed biometric print matches with the Bio-print identification Number;

a display co-operating with the microprocessor adapted to receive and display the decrypted authentication token; and a rechargeable power supply co-operating with the microprocessor adapted to energize the bio print reader.

In accordance with this disclosure, there is provided a method for identifying users via biometrics and performing non-repudiation for securing critical transactions, the method comprising the following steps:

capturing designated biometric prints of a user at a server over a non-Internet based channel in conformance with pre-selected governmental agency standards;

personalizing the captured biometric prints of the user at the server and computing at least a set of personalized biometric signatures, wherein the personalized biometric signatures are represented as a Bio-print identification Number and User identification Number;

registering a bio print reader with the biometric signatures of the user and a unique Device identification Number;

executing a non-repudiation process at the server to identify and authenticate a user;

facilitating the non-repudiation process by verifying the identity of the user on matching a sensed biometric print of the user with the Bio-print identification Number stored on a bio print reader associated with the user; and generating a non-repudiation certificate at the server and authorizing a critical transaction in the event that the identity of the user is verified.

Typically, the step of personalizing the captured biometric prints includes the following steps:

applying a transformation function to make the captured biometric prints compatible with the corresponding user's bio print reader;

extracting salient features from the captured biometric prints of the user and representing them as the Bio-print identification Number;

generating and using a random number to apply a hash on the salient features of user's biometric prints to compute the User identification Number; and storing the Bio-print identification Number and the User identification Number on the bio print reader corresponding to the user over an unidirectional non-Internet based channel.

Furthermore, the step of registering the personalized biometric prints of the user includes the following steps:

generating a unique random number as the Device identification Number for a bio print reader;

embossing the unique Device identification Number on the bio print reader in the form selected from the group consisting of a 2D barcode, a QR code and a twelve digit code; and storing the unique Device identification Number and the User identification Number, in a bio repository.

Additionally, the step of facilitating the non-repudiation process includes the following steps:

sensing the biometric prints of a user on a corresponding bio print reader;

extracting salient features of the sensed biometric prints at the bio print reader; and comparing the extracting salient features with the Bio-print identification Number to verify the identity of the user.

Preferably, the method comprises the following steps for forensically repudiating a user:

retrieving the user's unique Device identification Number and corresponding User identification Number from the bio repository;

recapturing the biometric prints of the user and extracting salient features from the biometric prints;

generating a new random number and computing a new User identification Number based on the salient features and the random number; and comparing the new User identification Number with the retrieved old User identification Number to confirm the identity of the user in the event that the old and new identification numbers match.

BRIEF DESCRIPTION OF THE ACCOMPANYING DRAWINGS

Figure 2:
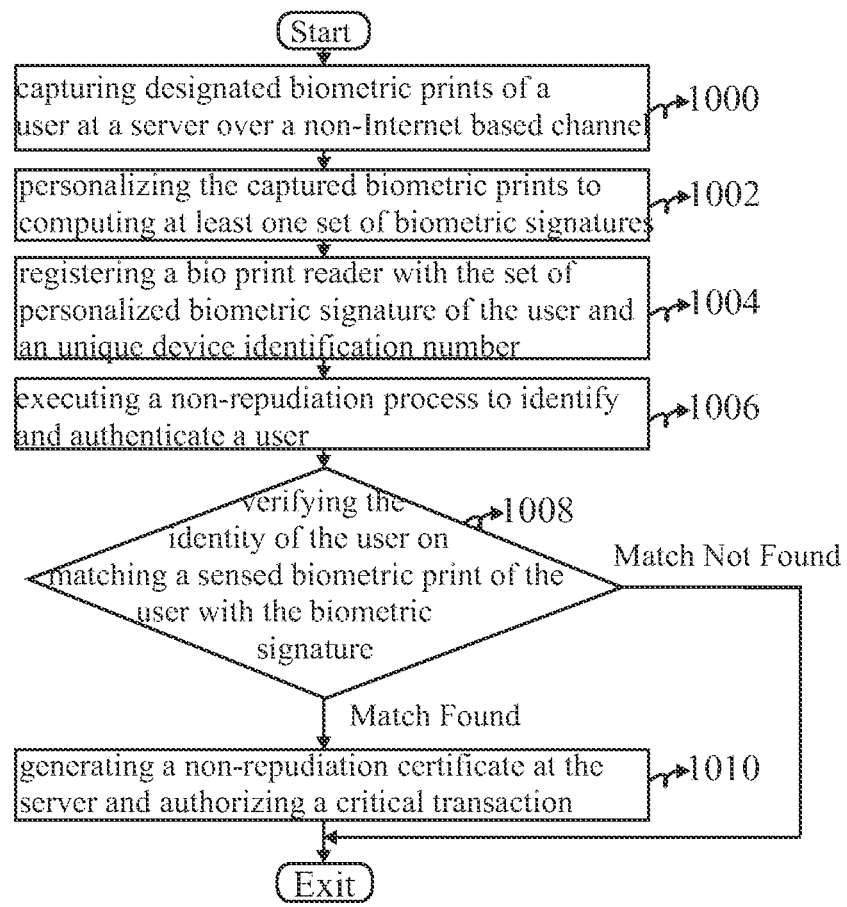

The personalized biometric identification and non-repudiation system will now be described with reference to the accompanying drawings, in which:

FIG. 1 illustrates a schematic of the personalized biometric identification and non-repudiation system in accordance with this disclosure; and FIG. 2 illustrates a flowchart showing the steps involved in identifying users via biometrics for performing non-repudiation for securing critical transactions in accordance with this disclosure.

DETAILED DESCRIPTION OF THE ACCOMPANYING DRAWINGS

The drawings and the description thereto are merely illustrative of a personalized biometric identification and non-repudiation system and a forensic fit non-repudiation procedure and only exemplify the invention and in no way limit the scope thereof.

The capabilities of biometric based authentication subsystems are not used to the fullest extent by existing authentication mechanisms. The reasons for the same can be attributed to the hardware related challenges involved in employing biometrics as a part of a non-repudiation process for authorizing Internet based critical transactions. And, the fears of users of losing their identity in the event that the biometric prints are tampered. To overcome the aforementioned challenges the present disclosure proposes a personalized biometric identification and non-repudiation system for users.

The proposed system provides personalized, low latency bio print readers which are owned by users and hold their biometric prints/bio prints. These bio print readers include at least one biometric sensor which can capture and process biometric prints of a user in real-time and thus facilitate in verifying the identity of a user in a non-repudiation process. As each bio print reader is uniquely associated with only one user and holds the user's biometric prints, the overhead faced by the retail or merchant websites of maintaining users' biometric prints and providing individual biometric scanners is eliminated. Thus, using the same bio print reader a user can perform multiple critical transactions for a plurality of vendors/agencies either over the Internet or to get authorized at a port of entry.

In accordance with this disclosure, the system also includes a TRUST server which performs a unidirectional non-Internet based communication with a plurality of bio print readers. The server provides a hardwired or optical or private channel based interface to the bio print readers using at least one of a flicker window, an application programming optical interface on a personal computer/mobile device or a smart card writer/ reader, which are not connected to Internet but physically wired to the TRUST server. A similar non-Internet based interface is also provided to biometric scanners to collect bio prints from users for personalization of their bio print readers.

The TRUST server & authorities performs the crucial task of extracting the bio prints and processing them in conformance with the standards set by a selected governmental agency. The TRUST server performs a three step process of capturing the bio prints, personalizing them and registering the personalized bio prints on a bio print reader associated with a user.

The TRUST server after capturing the bio prints performs algorithm engineering to transform the captured bio prints to be compatible to the user's bio print reader. The server then extracts only the salient/distinguishing features from the captured bio prints represented as Bio-print identification Number (BiN) for personalization. The process of personalization of bio prints involves executing a hash function on the salient features along with a randomly generated number to derive a personalized biometric signature represented by User identification Number (UiN). The UiN is a combination of up to 256 bits of a random hash of the salient features and a random number. The compatible BiN is stored on a corresponding user's bio print reader along with the UiN. Also, the TRUST server stores personal security protocols/key management process on the bio print reader to enable the bio print reader to carry out the non-repudiation process based computations.

For registering the user's bio print reader, the TRUST server generates a device specific random code typically a unique twelve digit Device identification Number (DiN) which is embossed on the bio print reader for discretely identifying the bio print reader and its corresponding user. The twelve digits DiN is embossed either as a 2D bar code, a QR code or a digit based series. The registration step may also include associating the twelve digit code with the country specific unique identification code, passport number or homeland details to closely tie the bio print reader details with the identity of the user.

After the personalization and registration steps, the TRUST server erases any copy of the original biometric prints collected by it. Instead the TRUST server only stores the UiN Bin and DiN along with the other registration details of the user, in a bio repository.

In accordance with this disclosure, for activation of the personalized bio print reader the user provides his/her predetermined bio print swipe on the reader's biometric sensor and if the real-time swipe, after processing, matches the stored BiN then the bio print reader is ready for use for any critical transaction.

In yet another process, a token is encrypted either using UiN in full or partial or any challenge number derived from the TRUST server which has compatibility for non-symmetric cryptography.

Thus, the present disclosure offers biometric based authentication and authorization of users for multiple enterprises including banks, point of sales and Banking, Financial and Insurance (BFI) domain, as a part of multi factor authentication over the Internet without compromising on the security as well as the biometric identity of the user.

For use in the aforementioned applications, as the bio print reader is a non-transmitting device it couples with a terminal over a non-Internet based channel to facilitate the non-repudiation process. Typically, for a POS type of critical transaction the bio print reader facilitates swipe less payment by enabling users to establish their identity with the TRUST server and accordingly allow direct debit of the due amount from a pre-linked e-bank account.

Furthermore, the TRUST server is also embedded with a 256 bit Advanced Encryption Standard (AES) algorithm which is installed on a cloud or on a hosted server to encrypt and transmit typically a flicker code based token. The back end application security of the TRUST server is conducted using Public Key Infrastructure (PKI), Symmetric Key Infrastructure (SKI), Clock synchronous Linear Feedback Shift Register (LFSR), Secure Socket Layer (SSL) tunnels and Key management and is managed on the hosted server. The TRUST server also includes a small Application Programming Interface (API) which offers secondary Domain Name System (DNS) management and session specific security to any authorizing application server (e.g.: banking application server) post authentication. In addition, the TRUST server includes a Geo locating commercial solution which is installed typically on the cloud to trace the details of a merchant.

In accordance with this disclosure, for performing a secure online transaction/retail transaction the following easy to adopt steps have been envisaged:

connecting to the TRUST server by making an authentication request from a terminal. The terminal for initiating the authentication request transmits the twelve digit DiN of the user's bio print reader to the TRUST server. The DiN is transmitted either via a bar code reader, as a text key-based input of the numbers or as an image of the bar code using a camera depending on the type of terminal used;

receiving the DiN of the user's bio print reader in the incoming authentication request at the TRUST server and the TRUST server further initiating a non-repudiation cycle by encrypting and sending a session specific authentication token to the corresponding POS terminal;

displaying the encrypted token at the terminal, wherein the encrypted token is typically in the form of an optical flicker code;

flashing the bio print reader towards the POS terminal to optically couple the user Bio device to accept the flicker code and the device decrypts the token using UiD and in conformance to the one time axioms set by the TRUST server.

prompting the user to swipe his/her predetermined biometric prints on the biometric sensor of the bio print reader;

processing and matching the swiped biometric prints with the personalized biometric prints BiN to decrypt and display the token. Thus, the decrypted token is secured jacketed and is only displayed on matching with appropriate BiN of the user;

entering the response for the displayed decrypted challenge token on a input device associated with the terminal and transmitting the response via the terminal to the TRUST server;

verifying the response at the TRUST server and authorizing payment for the corresponding online transaction/retail transaction.

In addition, the TRUST server of the present disclosure displays the credentials of the user associated with the bio print reader along with the geographical location and details of the retail store or merchant for confirmation before transmitting the encrypting token. This enables the users to ascertain their geo location and the POS terminal details before payment.

Alternatively, the system envisaged by the present disclosure can display the decrypted challenge token on user's bio personal gadget in the form of an OTP (One Time Password) and/or OTE (one time equation) or CAPTCHA pictures in the event that bio print reader doesn't work to satisfaction. In this scenario, the stored UiN plays the decryption role to extract the session based encrypted token. However, user has to communicate the choice of challenge process in advance to the server and configure appropriate setting on his/her bio print reader—for that particular session only.

Thus, the actual security of the bio print reader is achieved by the combination of the DiN and UiN as the first line challenge response process whereas the BiN is only used at the device decryption level to display the decrypted authentication token i.e. the OTP or the OTE contents. This mechanism offers strong online (Internet based communication line) security and highly personalized BiN for bio print reader level security.

Furthermore, the proposed system offers a non-repudiation process, which facilitates any governmental agency or a national body in forensically repudiating users. The proposed forensic non-repudiation process computes a unique Hash, which is derived from a set of unique random numbers and Bio print extracts of a user. Such a hash (UiN) is stored using a Bank's Public key. A similar PKI process is implemented at banking server, to encrypt the OTP/OTE token before transmitting it on any hostile network. The user's bio print reader and on-board computing process decrypts the token to extract the OTP/OTE.

Further, in the event of a non repudiation contest, where the user denies the transaction the procedure disclosed hereinafter can be implemented to prove "He is Who He is". This is achieved by the system envisaged by the present disclosure by proving that a particular DiN corresponds to only one UiN, which is used to encrypt the token and can only be read by the correct user device and can only be decrypted by one device that user is owning and further the token can be displayed only with the user's BiN.

The following steps have been envisaged in the event that any government agency, national body or law enforcing agency wants to forensically repudiate users for any legal implications, wherein the users are in possession of their corresponding personalized bio print readers:

Re-capture the bio prints of a user in doubt at the registrations center or bank in business;

Based on the device ID and other personal information, retrieve the earlier information including user specific hash and the unique user identification number (UiN) from the bio repository at the TRUST server;

generate a new random number based on the earlier stored seed to generate a new UiN;

compute a new hash with the old UiN and the newly captured Bio prints, and

If there is 1:1 conformance in the currently captured and computed HASH information, the information available on the user's personalized bio print reader and the information stored in the bio repository for that user at BFI, it is proved that user indeed is "He is Who is"

A similar exercise has to be undertaken to re-issue a personalized new bio print reader to a user in the event of a loss or damage of their personal Bio print readers, viz, user to offer new set of bio prints at registration center, compute new hash/UiN and compare it with earlier repository, and they old and new UiN match then banks can issue a new gadget post personalization, else, banks have to undertake a typical KYC route.

Referring to the accompanying drawings, FIG. 1 illustrates a schematic of the personalized biometric identification and non-repudiation system 100 to facilitate in securing critical transactions for users. The system comprises a TRUST server 102 which co-operates with a plurality of bio print readers X, $X_1$ to $X_n$, collectively represented by 126, over a unidirectional non-Internet based channel. The unidirectional non-Internet based channel is used by the TRUST server 102 to firstly capture designated biometric prints of a user and secondly to transfer a personalized biometric signature and registered unique device identification number to a corresponding bio prints reader 126. The TRUST server 102 also performs the task of executing a non-repudiation process to identify and authenticate a user and generate a non-repudiation certificate for authorizing a critical transaction.

The TRUST server 102, for performing the aforementioned tasks includes a bio print capturing unit 104 which interfaces with a biometric scanner (not shown in the figures) to collect at least one biometric print in conformance with pre-selected governmental agency standards. The bio print capturing unit 104 is typically hosted in a service center which offers personalization of the bio print readers 126. The biometric scanner is hardwired to the bio print capturing unit 104 and the bio print capture process is carried out in conformance with the process used in UID/Passport Seva in India, US Homeland or the like depending on the governmental agency selected. The bio print capturing unit 104 further applies a transformation function on the captured biometric print to make it compatible to a corresponding user's bio print reader 126.

For personalizing the captured bio prints, the TRUST server 102 includes a personalization unit 106. The personalization unit 106 further includes a feature extraction means 108 that digitizes and extracts salient features from the captured biometric print and forwards it to personalization means 110. The extracted salient features are further represented with a Bio-print identification Number (BiN).

The personalization means 110 includes a random number generator (not shown in the figure) which is used to generate a random number. This random number is used by the personalization means 110 to perform a hash function on the salient features to generate at least one personalized biometric signature typically in the form of a User identification Number (UiN). The BiN and UiN are transferred onto the bio print reader 126 via the communication unit 124 over a unidirectional non-Internet based channel.

After personalization, the TRUST server 102 registers the bio print reader 126 for a particular user via a registration unit 112. The registration unit 112 also includes random number generation means 114 which generates a unique Device identification Number (DiN) for a bio print reader 126. The registration unit 112 further includes registration means 116 which registers and transfers the DiN to a bio print reader corresponding to a user via the communication unit 124. The DiN is typically embossed on the bio print reader 126 in at least one of the forms selected from a 2D bar code, a twelve digit code and a Quick Response (QR) code.

In accordance with this disclosure, the communication unit 124 transfers the aforementioned data onto the bio print reader 126 over a unidirectional (one-way) non-Internet based channel which can be at least one of a flicker window, an application programmable optical interface and a smart card reader/writer interface hardwired to the TRUST server 102.

The registration unit 112 also includes gadget authentication means 118 which initiates a first (one-time) self-authentication request to a bio print reader 126 to activate the bio print reader's registration. The self-authentication requires the user to provide his/her real-time biometric print on the scanner provided on his/her bio print reader 126. This real-time biometric print is processed by the bio print reader 126 and compared with the BiN, if the real-time biometric print and the BiN match, then the bio print reader's 126 registration is complete, it is activated and ready for use. The bio print reader 126 is then handed over to the corresponding user for usage.

The TRUST server 102 erases all the bio prints acquired during personalization and only stores the UiN along with the corresponding user's details and bio print reader's 126 unique DiN in a bio repository 120.

In addition to personalizing the bio print readers 126, the TRUST server 102 also executes the non-repudiation process and identifies and authenticates a user to generate a non-repudiation certificate for authorizing a critical transaction. The TRUST server 102 includes an authentication unit 122 which generates at least one encrypted authentication token on receiving an incoming authentication request. The authentication token is a challenge-response type of multi-factor authentication based token, wherein biometric verification can also be included as one of the factors.

In accordance with this disclosure, the incoming authentication request is received from a terminal (not shown in the figures) performing a critical transaction like requesting for debit of an amount, access to BFI websites or the like. The authentication token is typically an OTP or OTE and encrypted in the form of a flicker code and transmitted to the requesting terminal. The token is encrypted by the authentication unit 122 using the User identification Number in full or partial or using any challenge number which is compatible for non-symmetric cryptography.

In accordance with another aspect of this disclosure, the TRUST server 102 performs the task of forensically repudiating a user to prove that "He is Who He is". For forensically repudiating a user, the TRUST server 102 further comprises retrieving means 138 that retrieves the user's stored DiN and corresponding UiN from the bio repository 120. A triggering means 140 then instructs the bio print capturing unit 104 and the personalization unit 106 to trigger the process of recapturing the user's biometric prints and computing a new UiN. On generation of the new UiN, the triggering means 140 means further instructs verification means 142 to compare the retrieved old UiN, received from the retrieving means 138, with the new UiN. The verification means 142 confirms the identity of the user if the old and new identification numbers match. The verification confirmation is sent via the communication unit 124 to the concerned governmental authority/agency/BFI who wants to perform the forensic show down. The TRUST server 102 also performs the identity verification to re-issue a new personalized bio print reader to a user in the event of loss or damage of their personal Bio print reader 126.

The personalized bio print readers 126 which are discretely associated with the users perform an important part in the repudiation process. The terminal while sending the authentication request transmits the unique device identification number (DiN) of the bio print reader 126, owned by the user performing the critical transaction. The unique DiN of the bio print reader 126 is transmitted to the TRUST server 102 by either scanning the 2D barcode/QR code or keying in the twelve digit code or as an image of the 2D barcode/QR code via the camera.

The TRUST server 102 acknowledges the receipt of the unique device identification number of the bio print reader 126 by returning the details of the corresponding user from the bio repository 120 and the location of the terminal (using a GPS application). Once the details are confirmed by the user via the input device at the terminal, the TRUST server 102 transmits a session specific encrypted authentication token for display on the terminal. The bio print reader 126 facilitates the non-repudiation process by verifying the identity of a user by prompting the user to provide his/her pre-designated biometric prints and matching them with the BiN embedded by the TRUST server 102. On verification the bio print reader 126 decrypts the encrypted authentication token using the UiN and displays the session specific authentication token. The response for the authentication token is entered by the user on the terminal for sending to the TRUST server 102 for verification. On successful verification, the TRUST server 102 generates a non-repudiation certificate and authorizes a critical transaction. The TRUST server 102 co-operates with a plurality of application servers (not shown in the figure) which are merchant e-commerce, retail, banking or the like web sites for facilitating critical transactions.

In accordance with this disclosure, the bio print reader 126 includes a read-only memory 128 which stores the compatible bio prints and at least one personalized biometric print of a user. The bio print reader 126 also includes at least one biometric sensor and an optical sensor, collectively represented by 130. The sensors 130 are employed to sense at least one encrypted authentication token optically and at least one predetermined biometric print of a user.

The optical sensor is used to optically couple and read the encrypted flicker code based authentication token from the display of the terminal. On reading the encrypted authentication token the bio print reader 126 prompts the user to provide his/her biometric prints to decrypt the token. The biometric sensor 130 receives the pre-designated prints of the user and passes them to a microprocessor 132.

The microprocessor 132 is embedded with custom applications including security protocols, biometric hash and key management application by the TRUST server 102 and co-operates with the read-only memory 128 and the sensors 130. The microprocessor 132 processes the sensed biometric print by extracting the salient features to generate a biometric signature. The microprocessor 132 then compares the biometric signature with the BiN stored in the memory 128 and decrypts the encrypted authentication token using the UiN and the key management application in the event that the biometric prints match.

The bio print reader 126 also includes a display 134 which co-operates with the microprocessor 132 to receive and display the decrypted authentication token. The bio print reader 126 also includes a rechargeable power supply 136 which co-operates with the microprocessor 132 to energize the bio print reader 126. The power supply 136 can be recharged via a USB (Universal Serial Bus) port. Thus, the bio print reader 126 does not connect to the Internet for verifying the identity of users and therefore keeps the biometric prints of the users secure, tamper free and in the custody of the users themselves.

In accordance with this disclosure, following is a typical scenario for facilitating swipe less payment in a restaurant/hotel using the proposed system:

the front desk of the restaurant/hotel using a Wi-Fi enabled terminal (e.g. a tablet with built-in camera) scans the DiN of the user's bio print reader 126 via the camera and transmits it to the TRUST server 102;

the TRUST server 102 returns the geo location and user details to the calling terminal, which when confirmed enable display of a flicker window holding the OTP (authentication token) on the terminal and simultaneously the TRUST server 102 establishes a onetime session connectivity with the application server (for e.g. user's bank);

the user agrees on the amount to be paid and opens the OTP by swiping appropriate finger on the biometric sensor 130; on successful verification the OTP appears on the display 134 of the bio print reader 126 and the response to the OTP is returned to the TRUST server 102 via the terminal;

on verification of the response, the TRUST server 102 and the selected application server complete the payment process and notify the hotel/restaurant of the transaction completion; and the TRUST server 102 issues a valid certificate to the selected application server and completes the transaction and is ready to take the next critical transaction.

In accordance with this disclosure there is provided a method for identifying users and performing non-repudiation via biometrics for securing critical transactions, the method comprising the following steps as seen in FIG. 2:

capturing pre-designated biometric prints of a user at a server over a non-Internet based channel in conformance with pre-selected governmental agency standards 1000;

personalizing the captured biometric prints of the user at the server and computing at least a set of personalized biometric signatures, wherein the personalized biometric signatures are represented as a Bio-print identification Number and User identification Number 1002;

registering a bio print reader with the personalized biometric prints of the user and a unique Device identification Number 1004;

executing a non-repudiation process at the server to identify and authenticate a user 1006;

facilitating the non-repudiation process by verifying the identity of the user on matching a sensed biometric print of the user with the personalized biometric print on a bio print reader associated with the user 1008; and generating a non-repudiation certificate at the server and authorizing a critical transaction in the event that the identity of the user is verified 1010.

Further, the method for personalizing the captured biometric prints includes the steps of applying a transformation function to make the captured biometric prints compatible with the corresponding user's bio print reader; extracting salient features from the captured biometric prints of the user and representing them as the Bio-print identification Number; generating and using a random number to apply a hash on the salient features of user's biometric prints to compute the User identification Number; and storing the Bio-print identification Number and the User identification Number on the bio print reader corresponding to the user over an unidirectional non-Internet based channel.

Still further, the method for registering the personalized biometric prints of the user includes the step of generating a unique random number as the Device identification Number for a bio print reader; embossing the unique Device identification Number on the bio print reader in the form selected from the group consisting of a 2D barcode, a QR code and a twelve digit code; and storing the unique Device identification Number and the User identification Number, in a bio repository.

Furthermore, the method for facilitating the non-repudiation process includes the steps of sensing the biometric prints of a user on a corresponding bio print reader; extracting salient features of the sensed biometric prints at the bio print reader; and comparing the extracting salient features with the Bio-print identification Number to verify the identity of the user.

In addition, the method comprises the following steps for forensically repudiating a user or issuing a new bio print reader:

retrieving the user's unique Device identification Number and corresponding User identification Number from the bio repository;

recapturing the biometric prints of the user and extracting salient features from the biometric prints;

generating a new random number and computing a new User identification Number based on the salient features and the random number; and comparing the new User identification Number with the retrieved old User identification Number to confirm the identity of the user in the event that the old and new identification numbers match.

TECHNICAL ADVANTAGES

The technical advantages of the present disclosure include providing a personalized biometric identification system that harnesses the power of biometric systems without compromising on the safety of the biometric prints of users.

The system captures biometric prints of users for personalization in conformance with standards laid by governmental agencies over a non-Internet based channel. Also, the system ensures that no record of the originally captured biometric print is stored on any server after personalization.

Additionally, the system provides low latency bio print readers that are owned by the users that facilitate storage of the biometric prints of the users and in the non-repudiation process.

Further, the system prevents tampering of the biometric prints of the users by ensuring that the biometric prints are not transmitted over the Internet for conducting non-repudiation.

Still further the system ensures that the biometric prints of users are not stored centrally at any server but with the users themselves on their bio print readers. In effect, user will own and use their bio prints for any e-Transactions.

Furthermore, the proposed system overcomes the challenges faced by retail markets/e-commerce, e-transaction and e-banking applications in adding biometric as a part of the multi factor authentication suit by providing users with personalized bio print readers which not only holds their original biometric prints but also facilitates in issuing non-repudiation certificates for authorizing critical transactions. Thus, the retail markets/e-commerce and e-banking applications do not have to face the challenge of providing a discrete biometric scanner to add biometric as a part of each of their multi factor authentication suits. The proposed system can also be used as a strong escrow management authentication tool for managers of multiple business disciplines.

In addition, the proposed system provides a strong non-repudiation process to enable any future forensic trail.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A personalized biometric identification and non-repudiation system to facilitate in securing critical transactions for users, said system comprising:
    a server adapted to personalize designated biometric prints of a user to compute and register at least one set of personalized biometric signatures with a unique Device identification Number, wherein said set of personalized biometric signatures are represented by a Bio-print identification Number and a User identification Number, said server further adapted to execute a non-repudiation process to identify and authenticate a user and generate a non-repudiation certificate for authorizing a critical transaction; and
    a plurality of bio print readers discretely associated with the users and embedded with said set of personalized biometric signatures for a user by said server over a unidirectional non-Internet based channel, each said bio print reader adapted to facilitate said non-repudiation process by verifying the identity of a user on matching a sensed biometric print of a user with said biometric signature;
    wherein each said bio print read comprises:
        a read-only memory adapted to store at least said Bio-print identification Number and said User identification Number;
        at least one sensor selected from the group consisting of a biometric sensor and an optical sensor, said sensor adapted to sense at least one encrypted authentication token and at least one designated biometric print of a user;
        a microprocessor embedded with custom applications including security protocols, biometric hash and key management application and co-operating with said memory and said sensor, said microprocessor adapted to process the sensed biometric print of the user and further adapted to decrypt said encrypted authentication token using said User identification Number in the event that the processed biometric print matches with said Bio-print identification Number;
        a display co-operating with said microprocessor adapted to receive and display said decrypted authentication token; and
        a rechargeable power supply co-operating with said microprocessor adapted to energize said bio print reader.

2. The system as claimed in claim 1, wherein said unique Device identification Number is embossed on said bio print reader, said unique device identification number is selected from the group consisting of a 2D bar code, a twelve digit code and a Quick Response (QR) code.

3. The system as claimed in claim 1, wherein said unidirectional non-Internet based communication channel is selected from the group consisting of a flicker window, an application programmable optical interface and a smart card reader/writer interface hardwired to said server.

4. The system as claimed in claim 1, wherein said server comprises:
    a bio print capturing unit adapted to interface with a biometric scanner and capture at least one biometric print for a user over a non-Internet based channel in conformance with pre-selected governmental agency standards and further adapted to apply transformation function on the captured biometric print to make it compatible for data transfer on a corresponding user's bio print reader;

a personalization unit having:
  feature extraction means adapted to digitize and extract salient features from the compatible biometric print and represent them as said Bio-print identification Number; and
  personalization means adapted to hash said salient features using a random number to generate at least one biometric hash represented as said User identification Number;

a registration unit co-operating with said personalization unit having:
  random number generation means adapted to generate said unique Device identification Number for a bio print reader;
  registration means adapted to register and transfer said Bio-print identification Number, said User identification Number, and said Device identification Number to a bio print reader corresponding to a user; and
  gadget authentication means adapted to initiate a first self-authentication request to a bio print reader to activate said bio print reader registration;

a bio repository adapted to store user details, said User identification Number and corresponding bio print reader's Device identification Number;

an authentication unit adapted to generate at least one encrypted authentication token on receiving an incoming authentication request and further adapted to verify response for said token to authenticate identity of a user, generate a non-repudiation certificate and authorize a critical transaction, wherein said authentication unit encrypts said authentication token using said User identification Number stored in said bio repository in full or partial or using any challenge number which is compatible for non-symmetric cryptography; and a communication unit co-operating with said bio print capturing unit, said registration unit and said authentication unit and adapted to provide multiple communication channels including Internet and non-Internet based channels to transfer and receive information.

5. The system as claimed in claim 1, wherein said server for forensically repudiating a user further comprises:
  retrieving means adapted to retrieve the user's unique Device identification Number and corresponding User identification Number from said bio repository;
  triggering means adapted to instruct said bio print capturing unit and said personalization unit to trigger the process of recapturing the user's biometric prints and computing a new User identification Number; and
  verification means co-operating with said personalization unit, said retrieving means and said triggering means, said verification means adapted to compare said new User identification Number with the retrieved old User identification Number to confirm the identity of the user in the event that the old and new identification numbers match.

6. A method for identifying users via biometrics and performing non-repudiation for securing critical transactions, said method comprising the following steps:
  at a server, capturing designated biometric prints of a user at a server over a non-Internet based channel in conformance with pre-selected governmental agency standards;
  at the server, personalizing the captured biometric prints of the user at said server and computing at least a set of personalized biometric signatures, wherein the personalized biometric signatures are represented as a Bio-print identification Number and User identification Number;
  at the server, registering a bio print reader with said biometric signatures of the user and a unique Device identification Number;
  at the server, executing a non-repudiation process at said server to identify and authenticate a user;
  at a plurality of bio print readers, facilitating said non-repudiation process by verifying the identity of the user on matching a sensed biometric print of the user with said Bio-print identification Number stored on a bio print reader associated with the user; and
  generating a non-repudiation certificate at said server and authorizing a critical transaction in the event that the identity of the user is verified;
  wherein said bio print reader comprises:
    a read-only memory adapted to store at least said Bio-print identification Number and said User identification Number;
    at least one sensor selected from the group consisting of a biometric sensor and an optical sensor, said sensor adapted to sense at least one encrypted authentication token and at least one designated biometric print of a user;
    a microprocessor embedded with custom applications including security protocols, biometric hash and key management application and co-operating with said memory and said sensor, said microprocessor adapted to process the sensed biometric print of the user and further adapted to decrypt said encrypted authentication token using said User identification Number in the event that the processed biometric print matches with said Bio-print identification Number;
    a display co-operating with said microprocessor adapted to receive and display said decrypted authentication token; and
    a rechargeable power supply co-operating with said microprocessor adapted to energize said bio print reader.

7. The method as claimed in claim 6, wherein the step of personalizing the captured biometric prints includes the following steps:
  applying a transformation function to make the captured biometric prints compatible with the corresponding user's bio print reader;
  extracting salient features from the captured biometric prints of the user and representing them as said Bio-print identification Number;
  generating and using a random number to apply a hash on said salient features of user's biometric prints to compute said User identification Number; and
  storing said Bio-print identification Number and said User identification Number on the bio print reader corresponding to the user over an unidirectional non-Internet based channel.

8. The method as claimed in claim 6, wherein the step of registering the personalized biometric prints of the user includes the following steps:
  generating a unique random number as said Device identification Number for a bio print reader;
  embossing said unique Device identification Number on said bio print reader in the form selected from the group consisting of a 2D barcode, a QR code and a twelve digit code; and storing said unique Device identification Number and said User identification Number, in a bio repository.

9. The method as claimed in claim 6, wherein the step of facilitating said non-repudiation process includes the following steps:

sensing the biometric prints of a user on a corresponding bio print reader;

extracting salient features of the sensed biometric prints at said bio print reader; and comparing said extracting salient features with said Bio-print identification Number to verify the identity of the user.

10. The method as claimed in claim 6, wherein the method comprises the following steps for forensically repudiating a user:

retrieving the user's unique Device identification Number and corresponding User identification Number from said bio repository;

recapturing the biometric prints of the user and extracting salient features from said biometric prints;

generating a new random number and computing a new User identification Number based on said salient features and said random number; and comparing said new User identification Number with the retrieved old User identification Number to confirm the identity of the user in the event that the old and new identification numbers match.

\* \* \* \* \*